United States Patent [19]
Chapman

[11] 3,948,767
[45] Apr. 6, 1976

[54] METHOD AND APPARATUS FOR SEPARATING OIL FROM AQUEOUS LIQUIDS

[76] Inventor: Willis F. Chapman, 6511 Jay Miller Drive, Falls Church, Va. 22041

[22] Filed: Feb. 6, 1974

[21] Appl. No.: 440,093

[52] U.S. Cl............ 210/20; 210/23 R; 210/73 W; 210/266; 210/289; 210/293; 210/301; 210/302; 210/307; 210/316; 210/317; 210/DIG. 5; 210/DIG. 26
[51] Int. Cl.² ........................................ B01D 13/00
[58] Field of Search ............ 210/20, 23, DIG. 5, 73, 210/DIG. 21, 314, 266, 287, 289, 291, 293, 300, 301, 302, 307, 316, 317, 109, 110, 115; 208/187, 188; 196/14.5

[56] References Cited
UNITED STATES PATENTS

| | | | |
|---|---|---|---|
| 1,947,709 | 2/1934 | Garrison et al. | 210/23 |
| 2,922,750 | 1/1960 | Price | 210/23 |
| 3,208,596 | 9/1965 | Gravent | 210/23 |
| 3,450,632 | 7/1969 | Olson et al. | 210/23 |
| 3,469,702 | 9/1969 | Perren | 210/540 |
| 3,747,766 | 7/1973 | Brooks | 210/300 |

*Primary Examiner*—Thomas G. Wyse
*Assistant Examiner*—F. F. Calvetti
*Attorney, Agent, or Firm*—Dressler, Goldsmith, Clement & Gordon, Ltd.

[57] ABSTRACT

A method and apparatus are provided for separating oily particles from an emulsion thereof in an aqueous liquid. The emulsion is passed through a bed of oleophilic granules supported on a foraminous support, the oleophilic granules, by virtue of their density, pressing against the foraminous support and the bed is unconfined downstream thereof so that the granules in the bed are fluidized by the passage of liquid therethrough. The oily particles are removed from the emulsion by the oleophilic granules in the bed, and the oily material accumulates and agglomerates and is transported out of the bed by the passage of liquid therethrough. The movement of the liquid then carries the oily droplets which are formed in the bed and deposits them upon a screen positioned downstream of the bed, the aqueous liquid passing through the screen in purified form. The oil accumulates on the screen and is propelled by the moving liquid into an oil reservoir positioned downstream of the screen.

4 Claims, 1 Drawing Figure

U.S. Patent  April 6, 1976  3,948,767
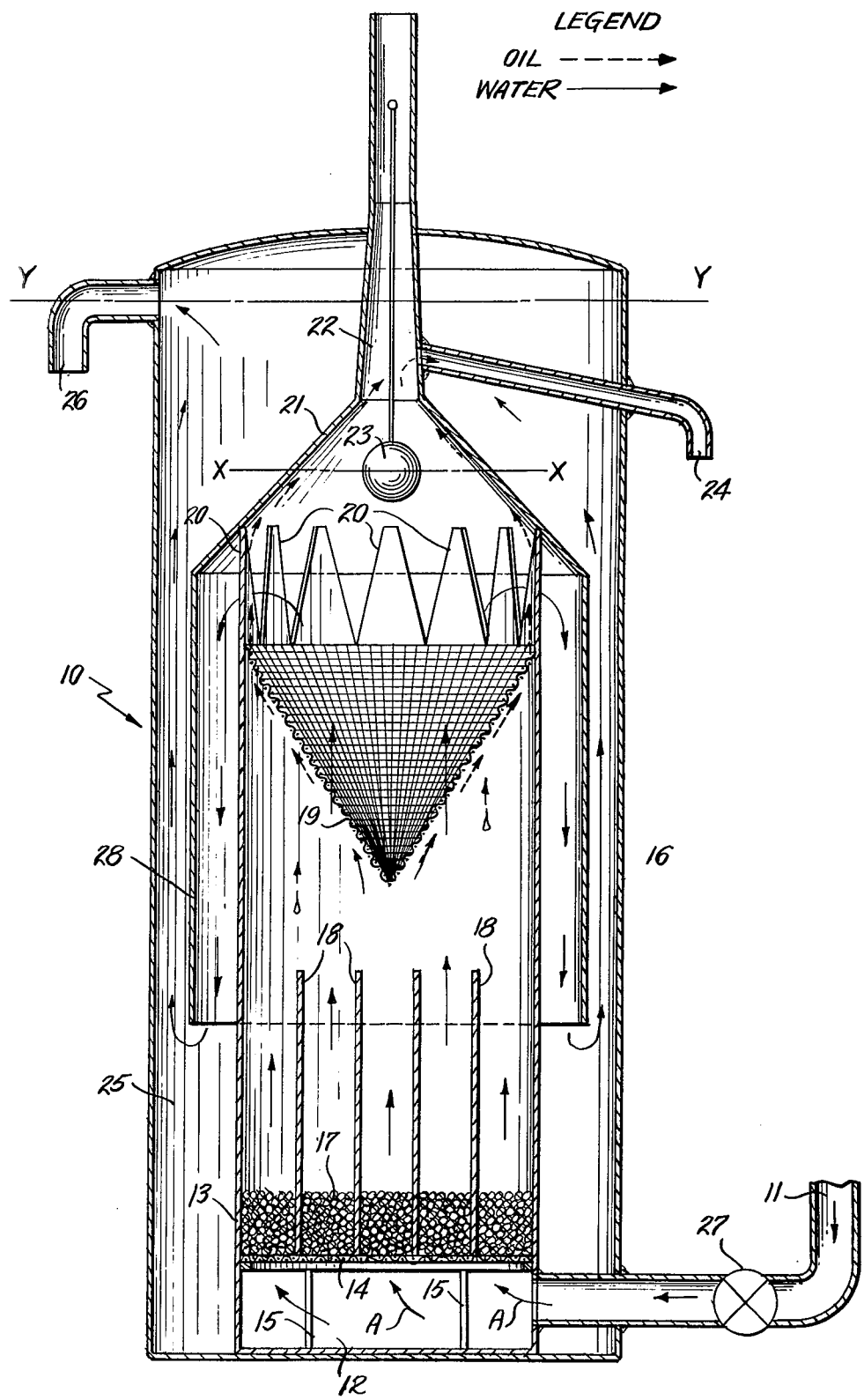

METHOD AND APPARATUS FOR SEPARATING OIL FROM AQUEOUS LIQUIDS

This invention relates to the separation of immiscible liquids, especially but not exclusively limited to oil and water.

The salient characteristics of this separator are:
1. High flow rate.
2. Essentially complete separation of the liquids.
3. Fully operational on unstable platforms (ships).
4. Continuous operation.
5. Nonclogging.
6. Nothing to wear out or replace.
7. Simplicity.
8. Economy. Low initial cost. Complete recovery of oil. Low maintenance and operating cost.

To date, the problem of separating oil contamination from industrial water waste to meet the effluent standards prescribed by the U.S. Environmental Protection Agency (EPA) has been formidable. Solutions to the problem have been, in general, complex, slow, and expensive. Current EPA standards prohibit more than 15 ppm (parts per million) of hydrocarbon contamination of the effluent before it can be discharged into the environment. Current U.S. Government research contracts are directed toward acquiring a capability which will permit the reduction of this standard to 10 ppm in the near future and, hopefully, 5 ppm as a long range goal.

This invention provides a simple, economical method of extracting oil contamination from the mainstream of the influent with a high degree of clarification, believed to be less than 2ppm. 1 ppm of oil in water is normally detectable both by odor and taste. Tests to date using this method have resulted in the absence of detectable odor and taste in the discharged water, leading to the conclusion that it contains less than 1 ppm of oil.

The method and apparatus of this invention are not restricted to contaminating hydrocarbons, but are generally applicable to all oily substances, animal, vegetable, or mineral, which may be suspended in water or other immiscible liquid in the form of fine particles, referred to herein as an emulsion. The method and apparatus described herein are suitable for the separation of many immiscible liquid combinations, so long as the granules used in the apparatus are selected to be oleophilic so as to pick up the suspended oily particles and not the continuous liquid phase, which is normally aqueous. The term "emulsion" as used herein includes the presence of nonemulsified material. The term "oleophilic" is used generically to denote an affinity for the contaminating dispersed liquid, and is not limited to oil.

Accordingly, and while the invention is broadly applicable to all immiscible liquid substances (denoted as oily herein) which are finely suspended in aqueous liquids so long as the oily substance is sufficiently fluid to be coalesced (or means are employed as described hereinafter to assist coalescence) it will be appreciated that the invention is primarily directed to the removal of emulsified oil particles from water (fresh water or salt water), and the invention will be described with reference to its normal form in which the material is oil, and the aqueous liquid is water. Of course, the purity of the effluent water is of primary concern.

The method of this invention separates oil from an emulsion through a bed of oleophilic granules having a density sufficiently different from the aqueous liquid to cause the granules to resist the movement of the emulsion, the passage of the emulsion through the bed serving to fluidize the granules of the bed and contact of the emulsion with these granules serving to remove the emulsified oil particles from the emulsion. The water from which emulsified oil particles have been removed is then moved downstream of the bed while the granules in the bed retain the removed oil until it coalesces to form nonemulsified droplets. The movement of the water through the bed serves to cause the bed to release the droplets of oil which are then transported by the liquid downstream of the bed where the oil is separated, preferably by passage through a foraminous oil interceptor (a screen) so that the water free of oil passes through the screen, and the oil remains on the screen enabling its removal.

In normal practice, the oleophilic granules have a density greater than water, and the apparatus takes the form of a separator structure having an emulsion inlet chamber at the bottom, and an oil storage chamber at the top. Accordingly, the apparatus can be conveniently described in its preferred form as a separator having an emulsion inlet chamber positioned beneath a foraminous support. A bed of oleophilic granules having a density greater than water is positioned on the foraminous support, the bed being upwardly unconfined so that the emulsion in the inlet chamber can flow upwardly through the foraminous support and then through the bed of oleophilic granules to fluidize the same and form a nonchanneled contact zone in which the granules of the bed contact the emulsified oil particles in the emulsion and remove the same. This removed oil accumulates within the bed of granules and the oil coalesces forming large droplets which are physically pulled out of the bed by the movement of the liquid therethrough. A foraminous oil interceptor is located above the bed in the path of the upwardly moving liquid leaving the bed, the interceptor normally taking the form of a screen which communicates with an oil storage chamber positioned above the same, and the oil removed by the interceptor flows to storage. In normal practice, the screen is inclined with respect to the direction of movement of the liquid so that the oil is forced upwardly to flow into the oil storage chamber where it can be removed whenever desired. Lastly, outlet means are positioned above the bottom of the oil interceptor and beneath the oil storage chamber to provide a space for removal of the purified water which has passed through the oil interceptor.

On the other hand, if the contaminating liquid is more dense than the aqueous liquid and would naturally tend to settle at the lowest level, the process may be inverted with the influent directed downwardly rather than upwardly. In this case, the heavier-than-water granules should be replaced by lighter-than-water granules, having an affinity for the contaminating liquid (oleophilic) which will tend to float upwardly against the entry support screen and to fluidize in a downward direction.

This invention will be described employing a preferred construction in which the separator has the form of a vertical cylinder, but the invention is not restricted to cylindrical geometry.

There is no restriction as to size and this high flow rate separator would therefore be applicable to a small industrial flow exiting into a sewer system. It could also be applicable to a large industrial system such as an oil refinery, oil field, oil drilling platform, harbor terminals, heavy industry installations, etc., with effluents exiting into natural waters. It would be highly effective aboard ships for cleaning bilge wastes and also for cleaning ballast water on oil tankers or other ships whose cleaning wastes are contaminated with oily substances. It would be particularly applicable to large oil spills at sea where a severe requirement exists to separate oil rapidly from large volumes of sea water recovered, simultaneously recovering the oil and returning clean water to the environment. In this regard, this invention tolerates oil in nonemulsified form as well as being applicable to the removal of fine particles of oil which are dispersed so finely so as to resist conventional separation.

Particular reference is made to machining operations where water-oil emulsions are employed to assist various cutting or drilling operations. Similarly, the invention is applicable to the treatment of aqueous latex wastes which occur in the paint industry. Other utilities will be evident to those skilled in the art.

The oleophilic granules which are employed may be of diverse character, though they are normally heavier than the water which then requires an upward passage of the emulsion. Silica particles of appropriate size can be used, but these are preferably treated to increase their affinity for oil. Aluminum granules are also useful. The preferred specific gravity of the oleophilic granules is in the range of 2.0 – 3.5. Particle size is not of prime significance, as long as the particle is able to resist being carried away by the moving liquid. It will be immediately evident that the particle beds in this invention may be large or small depending upon the flow rates desired.

Correspondingly, the granules may be very light, for example, hollow polystyrene beads. In such instance, the bed of granules is positioned below the foraminous support, and the emulsion is passed downwardly through the bed.

It is essential that the bed be unsupported downstream of the foraminous support. If this is not done, then the granules are packed together by the moving liquid. This severely restricts flow, and the accumulation of material in the compacted bed further restricts flow. In such packed beds, the liquid tends to form channels and some of the liquid is able to pass through the compacted bed without treatment.

In contrast, when the bed is unconfined downstream of its support, then the liquid passing through the bed fluidizes the particles and since a liquid is not compressible, there is no channeling and all of the liquid passing through the bed is equally treated by contact with the particles of the bed. Naturally, the bed will expand in proportion to the rate of flow so slower flow rates may provide superior treatment, but effective treatment is obtained substantially independent of the flow rate so that tremendous latitude in operation is enabled.

The oleophilic particles may be used as such, or they may be precoated with some oily material to enhance their affinity for the oil which is to be removed.

Correspondingly, in some instances, the oil to be removed is highly viscous, and does not coalesce. In such instances more fluid oils can be introduced into the emulsion to be treated in order to foster coalescence of the oil which is collected.

It is stressed that the conventional filter becomes clogged in use and must be discarded or its filter materials regenerated. In this invention, the bed of granules need not be replaced since the collected oil is continuously removed.

The invention will be more fully understood from the accompanying drawing in which the single FIGURE is a vertical cross-section of an illustrative separator constructed in accordance with this invention, and employing a cylindrical geometry.

Referring more particularly to the drawing, an emulsion of oil in water prescreened to eliminate foreign particles larger than the screen size used hereinafter to separate the oil is pumped to a separator assembly identified generally by the numeral 10. The separator 10 has an inlet 11 at its lower end through which the emulsion flows into an emulsion inlet chamber 12 which is positioned at the bottom of a vertical tube 13. This tube 13 takes the form of a container which is concentrically positioned within the outer walls or casing 16 of the separator 10. This emulsion inlet chamber 12 is formed beneath a foraminous support 14 which is positioned above the bottom of the tube 13 by means of supporting structure 15.

Contained in tube 13 and resting on screen 14, is a bed 17 of oleophilic granules, these granules being denser than water as previously explained.

In the described form of the invention, the inner container is partitioned as shown at 18 so that the bed is divided into a series of side-by-side beds. This is done when the bed 17 is very large, and it serves to maintain an even distribution of granules across the screen 14. As can be seen, the emulsion passes through the inlet 11 into the chamber 12, and passes upwardly as shown by arrows A with sufficient velocity to fluidize the bed 14, and then through the inner container 13 toward an overhead oil interceptor which is constituted by a conical screen 19.

The upper end of the inner container 13 is notched as shown at 20 and the upper end of the inverted conical screen 19 is secured below the lower end of the notches 20. As a result, water flowing upwardly through the container 13 will pass upwardly through the screen 19, and any large droplets of oil which have been removed from the bed 17 will be intercepted by the screen 19 whereupon, both from the standpoint of the lower specific gravity of oil, but more importantly from the standpoint of the upward pressure of the passing water, the oil will be forced upwardly on the screen until it contacts the notched portion 20 at the upper end of container 13. The notched portion 20 provides a solid oleophilic path.

The inclination of the screen with respect to the direction of flow is steep enough to remove all the oil. The angle of inclination is easily found for any screen by tilting it until the eye can discern no open spaces.

Overlying the upper end of the container 13 is a conical oil collector 21, the notched portion 20 contacting the interior of the conical collector 21. As a result, the oil collected by the screen 19 is forced upwardly along the oleophilic path until it reaches the conical collector 21 to form an oil layer in an oil storage chamber 22 positioned at the upper end of the oil collector 21. The recommended oil-water interface level in the device is shown by the phantom line X—X. An oil-water interface sensor and flow restrictor float 23 is provided to prevent water from flowing upwardly out of the oil collector 21 via the oil outlet 24. When too little oil remains in collector 21, float 23 rises to prevent water from exiting via outlet 24.

At the same time that the oil is exiting from the separator 10 through outlet 24 as described, water passing the screen 10 flows outwardly through the notches 20 which extend above the screen 19 and below the oil reservoir 22. The water, now free of oil, is then passed downwardly in the preferred structure shown through the annular chamber 25 formed between the exterior walls 16 of the separator and the container 13 to the water outlet 26.

The operation of the separator structure shown is extremely simple, it being only necessary to pump the emulsion through the separator, clean water exiting at 26, and the collected oil exiting at 24. The overall level of liquid in the separator shown by the phantom line Y—Y provides sufficient pressure head to raise the oil level to the oil outlet 24. A pressure actuated one way valve 27 in the inlet line 11 insures sufficient flow rate to fluidize the bed 17 and it also prevents back flow which might result in oil entering the clean water exit route.

The structure shown enables satisfactory operation even when the separator is tilted as might occur aboard ship. A skirt 28 which depends downwardly from the lower end of the conical oil collector is provided to contain the water-oil interface level within collector 21 during tilts.

It will also be appreciated that various adjuncts can be added in the form of controls, but these are aspects of commercial operation as opposed to the new oil removal structure, and the novel separation and recovery procedure.

The invention is defined in the claims which follow.

I claim:

1. Apparatus for removing oil from an emulsion of oil in water comprising, a separator having an emulsion inlet chamber and a foraminous support, a bed of oleophilic granules having a specific gravity different from water, said foraminous support separating said granules from said inlet chamber said bed being unconfined in the direction of flow so that said emulsion can flow through said foraminous support and then through said bed of granules to form a contact zone in which the granules of said bed contact the emulsified oil particles in the emulsion to remove oil from said emulsion, a screen located downstream of said bed in the path of the moving liquid leaving said bed, said screen being inclined to the direction of flow at an angle steep enough to remove the oil, said screen communicating with an oil storage chamber so that oil removed by said screen will flow to storage, and outlet means positioned between said screen and said oil storage chamber for removing purified water which has passed through said screen.

2. Apparatus as recited in claim 1 in which said screen is inclined with respect to the direction of flow at an angle at which the eye can discern no open spaces, said screen being in contact with a supporting member extending into said oil storage chamber.

3. In apparatus for removing oil from an aqueous liquid containing nonemulsified oil droplets, the improvement comprising container means for confining the flow of said aqueous liquid in a path through the container, a screen extending across said container so that all of the liquid flowing in said container must flow through said screen, said screen being inclined with respect to said path at an angle steep enough to remove the oil and so that the flow of liquid through said screen will propel the oil picked up by said screen along the screen in the direction of movement of said liquid, said screen contacting a continuous solid element providing an oleophilic path to an oil storage chamber.

4. A method for separating oily particles from an emulsion of said oily particles in an aqueous liquid comprising the steps of, first passing said emulsion through a bed of oleophilic granules having a specific gravity different from the specific gravity of the aqueous liquid to cause the granules to resist the movement of the emulsion, the passage of said emulsion through said bed serving to remove the emulsified oily particles from said emulsion, then passing said aqueous liquid from which emulsified oily particles have been removed beyond said bed, the oleophilic granules in said bed retaining the removed oily particles until they accumulate sufficiently to coalesce and form nonemulsified oily droplets, the movement of the aqueous liquid past said bed serving to carry away said droplets of oil, and then passing the upwardly moving aqueous liquid containing said oil droplets through a screen inclined to the direction of movement of said water at an angle steep enough to remove the oil so that water free of oil will pass through said screen to enable its removal, and the oil is left on said inclined screen to be propelled toward a storage area by the movement of the water, and removing the oil-free water which passes through said screen.

* * * * *

UNITED STATES PATENT OFFICE
CERTIFICATE OF CORRECTION

Patent No. 3,948,767  Dated April 6, 1976

Inventor(s) Willis F. Chapman

It is certified that error appears in the above-identified patent and that said Letters Patent are hereby corrected as shown below:

The term of this patent subsequent to

April 6, 1993, has been disclaimed.

[SEAL]

Signed and Sealed this

Sixth Day of July 1976

Attest:

RUTH C. MASON
Attesting Officer

C. MARSHALL DANN
Commissioner of Patents and Trademarks